United States Patent
Sugahara et al.

(10) Patent No.: US 7,812,578 B2
(45) Date of Patent: Oct. 12, 2010

(54) DC-DC CONVERTER

(75) Inventors: Satoshi Sugahara, Matsumoto (JP);
Kouhei Yamada, Matsumoto (JP);
Tetsuya Kawashima, Matsumoto (JP);
Akira Yamazaki, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 330 days.

(21) Appl. No.: 12/132,504

(22) Filed: Jun. 3, 2008

(65) Prior Publication Data

US 2009/0096436 A1 Apr. 16, 2009

(30) Foreign Application Priority Data

Jun. 4, 2007 (JP) ............................. 2007-147773

(51) Int. Cl.
*G05F 1/618* (2006.01)
*H02H 3/20* (2006.01)
*H02H 3/24* (2006.01)

(52) U.S. Cl. ...................... 323/224; 323/225; 323/271; 323/284

(58) Field of Classification Search ................. 323/222, 323/223, 224, 225, 259, 266, 268, 271, 282, 323/284; 361/111
See application file for complete search history.

(56) References Cited

U.S. PATENT DOCUMENTS

| 7,239,114 B2 * | 7/2007 | Durbaum et al. ............ 323/224 |
| 2002/0024826 A1 | 2/2002 | Katayama |
| 2006/0255782 A1 | 11/2006 | Sugiyama et al. |

FOREIGN PATENT DOCUMENTS

| JP | 2002-78326 | 3/2002 |
| JP | 2005-168170 | 6/2005 |

* cited by examiner

*Primary Examiner*—Gary L Laxton
(74) *Attorney, Agent, or Firm*—Rabin & Berdo, PC

(57) ABSTRACT

A DC-DC converter includes a series circuit of a main switch and a choke coil and an output capacitor connected to one end of the series circuit and outputs a DC voltage from the one end of the series circuit. A first MOS transistor is connected in parallel to the series circuit and a second MOS transistor is connected in parallel to the output capacitor. A control circuit controls the gate voltages of the first MOS transistor and/or the second MOS transistor so that the first MOS transistor and/or the second MOS transistor outputs a changed target output voltage, whereby the output voltage is made equal to the target voltage at high speed.

17 Claims, 17 Drawing Sheets

DC-DC CONVERTER

BACKGROUND OF THE INVENTION

1. Field of the Invention

The present invention relates to a DC-DC converter used in communication apparatus and the like. More particularly, the invention relates to a DC-DC converter that has improved transient response characteristics.

2. Description of the Related Art

DC-DC converters which convert an input DC voltage into a desired DC voltage and output the latter are widely used in communication apparatus and the like. For example, such DC-DC converters have a series circuit of a main switch and a choke coil and output a desired DC voltage to a load via an output capacitor.

FIG. 7 is a block diagram showing the configuration of a general DC-DC converter of such a type. An input voltage Vin from a DC power source 101 is converted by a converter section 102 into a desired output voltage Vout, which is supplied to a load 103. The converter section 102 includes an output stage and an LC filter and is composed of a coil, switches, a rectification element, a capacitor, etc.

A control circuit 110 which controls the converter section 102 is composed of a detection circuit 111 for detecting the output voltage Vout of the converter section 102, an error amplifier 113 for comparing a resulting detection voltage Vo with a reference voltage Vref supplied from a reference voltage source 112, and a comparator 115 that compares an output Ve of the error amplifier 113 with an output Vosc of an oscillator 114, and supplies a control signal Vcont to the converter section 102.

FIG. 8 shows the configuration of the control circuit 110 of the above conventional DC-DC converter. The detection circuit 111 is composed of voltage division resistors R101 and R102, and an output of the comparator 115 is input to the converter section 102 via a logic circuit 116. A series circuit of a resistor R103 and a capacitor C101 is connected between the inverting input terminal and the output terminal of the error amplifier 113.

FIGS. 9A and 9B are circuit diagrams showing exemplary configurations of the converter section 102 of the above conventional DC-DC converter. Each of these circuits constitutes a step-down converter. The circuit of FIG. 9A is provided with a series circuit of a choke coil L101 and a main switch S101. The main switch S101 is turned on or off by a drive circuit 120. An output capacitor C111 is connected to one end of the series circuit (i.e., the terminal of the choke coil L101 that is not connected to the main switch S101). A switch S102, which is turned on or off by the drive circuit 120, is connected to the connecting point of the main switch S101 and the choke coil L101. In the circuit of FIG. 9B, a diode D101 is used in place of the switch S102 used in the circuit of FIG. 9A.

In the DC-DC converter having the above converter section 102 and control circuit 110, when the output voltage Vout is changed by changing the reference voltage Vref, the response speed may be lowered due to occurrence of an overshoot or the like. A known DC-DC converter whose control circuit has an error amplifier is improved to increase the response speed when the output voltage is changed by changing the reference voltage, in particular, to settle the output voltage at high speed by reducing an overshoot (see, for example, JP-A-2002-78326 or the corresponding U.S. Pat. No. 6,469,483). In this DC-DC converter, the error amplifier is formed by cascade-connecting a differential amplification circuit and an analog amplification circuit both having a fixed operating point.

FIGS. 10A-10C are graphs showing frequency characteristics of the converter section 102 and the control circuit 110 of the conventional DC-DC converter of FIG. 7. Relationships between the gain (dB) and the frequency, and relationships between the phase (degrees) and the frequency are shown. FIG. 10A shows characteristics of the converter section 102, FIG. 10B shows characteristics of the control circuit 110, and FIG. 10C shows characteristics of the combination of the converter section 102 and the control circuit 110.

The converter section 102 exhibits characteristics of a low-pass filter that is composed mainly of a coil and/or a capacitor. The frequency characteristics of the control circuit 110 are adjusted so that the gain of the entire loop including the converter section 102 is made stable. In general, the operating frequency band of the control circuit 110 is set lower than that of the converter section 102 and its bandwidth is several kilohertz or less. Therefore, the frequency bandwidth of the entire loop including the converter section 102 and the control circuit 110 is also several kilohertz or less. The time constant T of a transient operation of the DC-DC converter is given by $T = 1/2\pi f$ (longer than several microseconds), where f is the above-mentioned bandwidth. In the DC-DC converter disclosed in JP-A-2002-78326, although the settling time is shortened by suppressing an overshoot, and the response waveform and the response time are improved, the response time is restricted by the frequency bandwidths of the control circuit and the converter section.

One method for eliminating the restriction due to the frequency bandwidth of the control circuit is to change the time ratio of the main switch S101 (see FIGS. 9A and 9B) stepwise at the same time that the target value of the output voltage is changed. This method can change the output voltage forcibly, independently of the response of the control circuit. However, in this case, the response of the control circuit is determined by the frequency characteristics of the DC-DC converter, that is, a damping constant and a phase constant that are determined by the loss resistance of the main switch S101, the inductance and the loss resistance of the choke coil L101, the capacitance and the loss resistance of the output capacitor C111 (see FIGS. 9A and 9B), and the load (i.e., the load 103 shown in FIG. 7).

To make the frequency range of the frequency characteristics of the above-described conventional DC-DC converter higher, it is necessary to decrease the inductance of the choke coil and the capacitance of the output capacitor. However, as the inductance of the choke coil and the capacitance of the output capacitor decrease, the AC loss increases due to an increase of the ripple in the output voltage and an increase of the AC current flowing through the choke coil, and the efficiency of the converter section thereby is lowered. Furthermore, to suppress an overshoot in a stepwise operation of the DC-DC converter, it is necessary to increase the loss of the converter section to suppress transient oscillation. This results in a problem that the efficiency of the converter section is lowered.

SUMMARY OF THE INVENTION

The present invention has been made in view of the above problems, and an object of the invention therefore is to provide a DC-DC converter that exhibits a high-speed transient response without lowering the efficiency of a converter section and without the need to decrease the parameters representing the characteristics of passive components of the converter section, in particular, the inductance of a coil and the capacitance of an output capacitor.

To attain the above object, a DC-DC converter having a series circuit of a main switch and an inductance element and an output capacitor connected to one end of the series circuit, and which outputs a DC-DC-converted DC voltage from the one end of the series circuit, is provided with a first transistor connected in parallel to the series circuit, and a second transistor connected in parallel to the output capacitor.

The output voltage of this DC-DC converter can be settled at a target value at high speed by adjusting the gate voltages of the first transistor and/or the second transistor according to the target output voltage. Therefore, the DC-DC converter can exhibit a high-speed transient response without lowering the efficiency of a converter section and without a need to decrease the parameters representing the characteristics of passive components of the converter section, in particular, the inductance of a coil and the capacitance of the output capacitor.

To attain the above object, the invention also provides a DC-DC converter having a series circuit of a main switch and an inductance element and an output capacitor connected to one end of the series circuit and which outputs a DC-DC-converted DC voltage from the one end of the series circuit, is provided with a first switch connected in parallel to the series circuit; and a second switch connected in parallel to the output capacitor.

The output voltage of this DC-DC converter can be settled at a target value at high speed by turning on/off the first switch and/or the second switch. Therefore, the DC-DC converter can exhibit a high-speed transient response without lowering the efficiency of a converter section and without a need to decrease the parameters representing the characteristics of passive components of the converter section, in particular, the inductance of a coil and the capacitance of the output capacitor.

Being capable of settling the output voltage at a target value at high speed by adjusting the gate voltage(s) of one or both of the transistors or turning on/off one or both of the switches, the DC-DC converter of this invention can exhibit a high-speed transient response without lowering the efficiency of a converter section and without a need to decrease the parameters representing the characteristics of passive components of the converter section, in particular, the inductance of a coil and the capacitance of the output capacitor.

DETAILED DESCRIPTION OF THE INVENTION

Embodiments of the invention will be hereinafter described with reference to the drawings. The DC-DC converter according to the invention is a DC-DC converter which is equipped with a series circuit of a main switch and an inductance element and an output capacitor connected to one end of the series circuit and which outputs a DC voltage from the one end of the series circuit. The embodiments are directed to step-down DC-DC converters that supply a load with an output voltage Vout produced by converting an input voltage Vin into a desired DC voltage.

Figure 1:
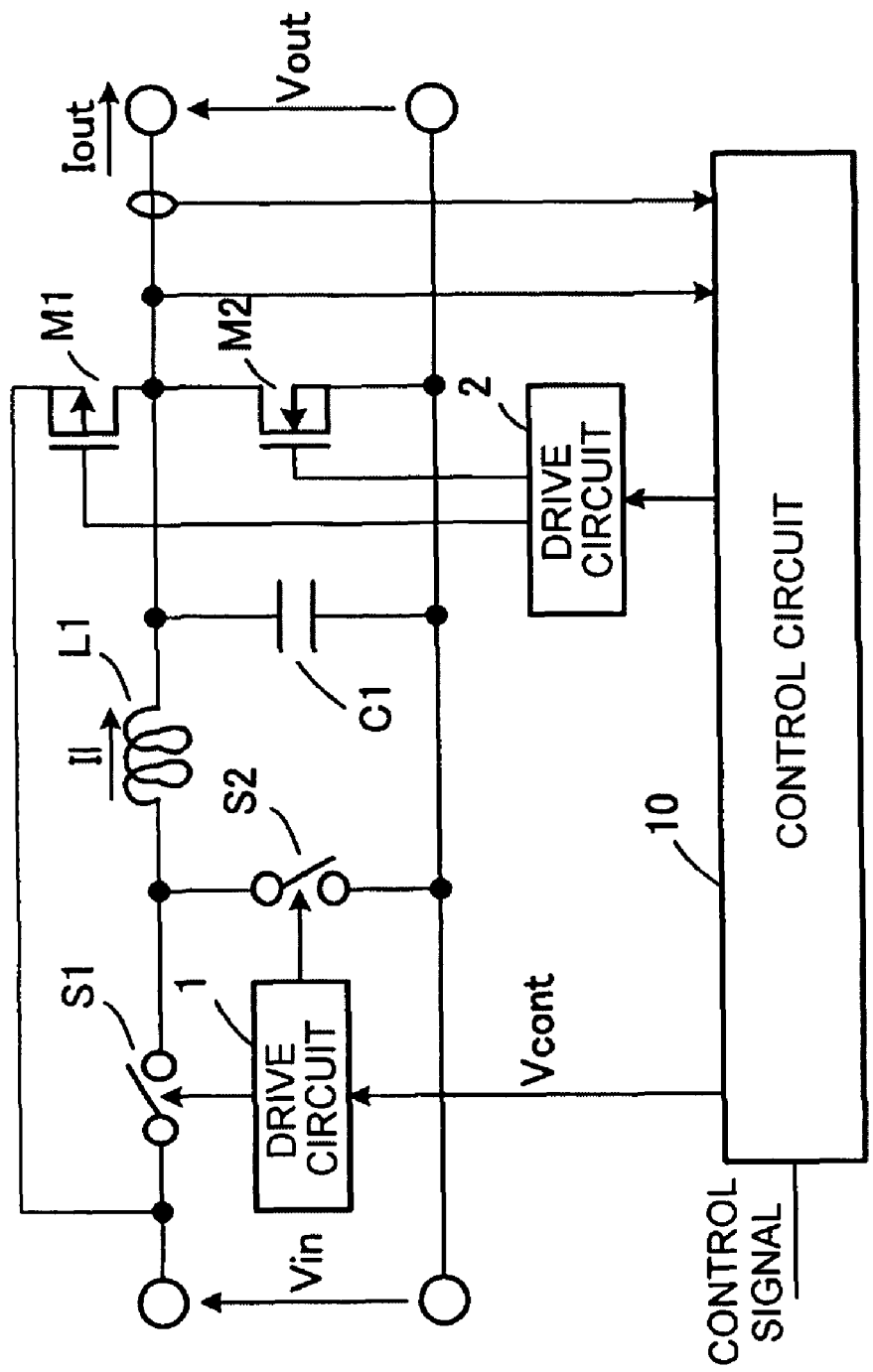
FIG. 1 is a circuit diagram showing the configuration of a DC-DC converter according to a first embodiment of the invention.

FIG. 1 is a circuit diagram showing the configuration of a DC-DC converter according to a first embodiment of the invention. The DC-DC converter according to the first embodiment is equipped with a series circuit of a main switch S1 and a choke coil L1 (inductance element), a p-channel MOS transistor M1 (first MOS transistor) which is connected in parallel to the series circuit, an output capacitor C1 which is connected to one end of the series circuit, and an n-channel MOS transistor M2 (second MOS transistor) which is connected in parallel to the capacitor C1. Furthermore, a switch S2 is connected to the connecting point of the main switch S1 and the choke coil L1, and the main switch S1 and the switch S2 are driven by a drive circuit 1. The first MOS transistor M1 and the second MOS transistor M2 are driven by a drive circuit 2, and the drive circuits 1 and 2 are controlled by a control circuit 10.

Figure 2:
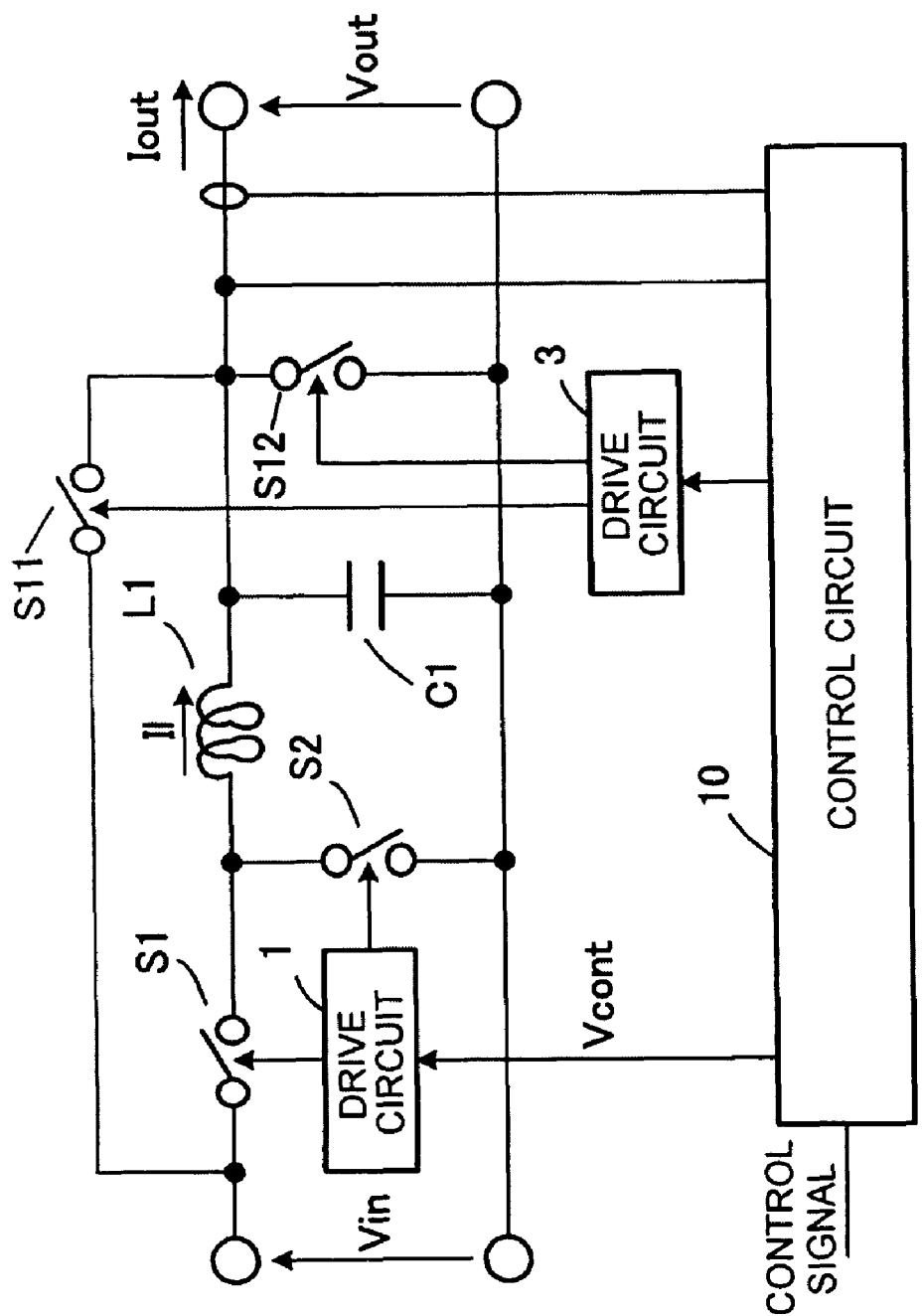
FIG. 2 is a circuit diagram showing the configuration of a DC-DC converter according to a second embodiment of the invention.

FIG. 2 is a circuit diagram showing the configuration of a DC-DC converter according to a second embodiment of the invention. The DC-DC converter according to the second embodiment is equipped with a series circuit of a main switch S1 and a choke coil L1, a first switch S11 which is connected in parallel to the series circuit, an output capacitor C1 which is connected to one end of the series circuit, and a second switch S12 which is connected in parallel to the capacitor C1. Furthermore, a switch S2 is connected to the connecting point of the main switch S1 and the choke coil L1, and the main switch S1 and the switch S2 are driven by a drive circuit 1. The first switch S11 and the second switch S12 are driven by a drive circuit 3, and the drive circuits 1 and 3 are controlled by a control circuit 10.

Figure 3A:
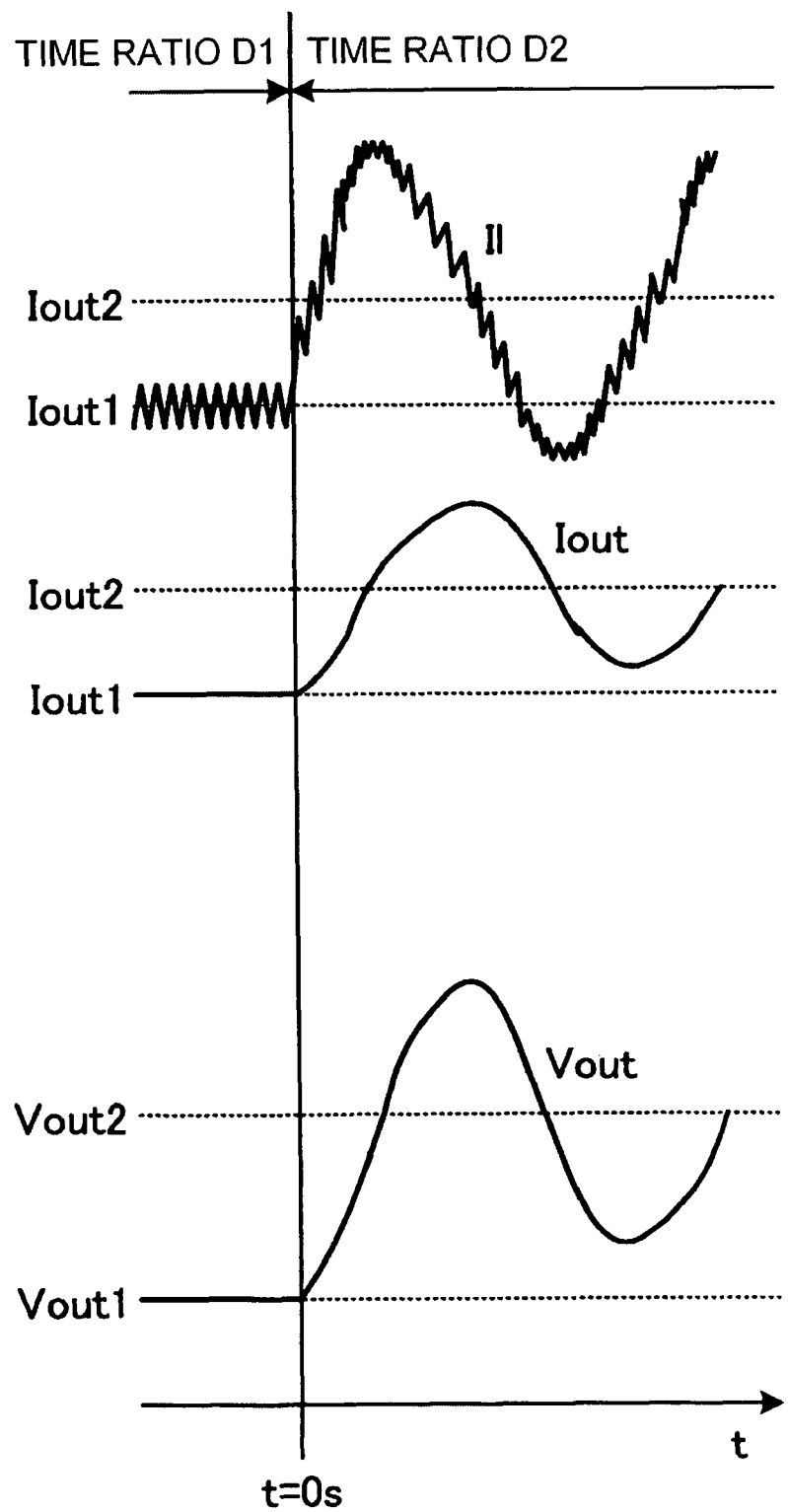
FIGS. 3A-3C are conceptual illustrations of transient-response waveforms of a voltage and currents of DC-DC converters.
Figure 3B:
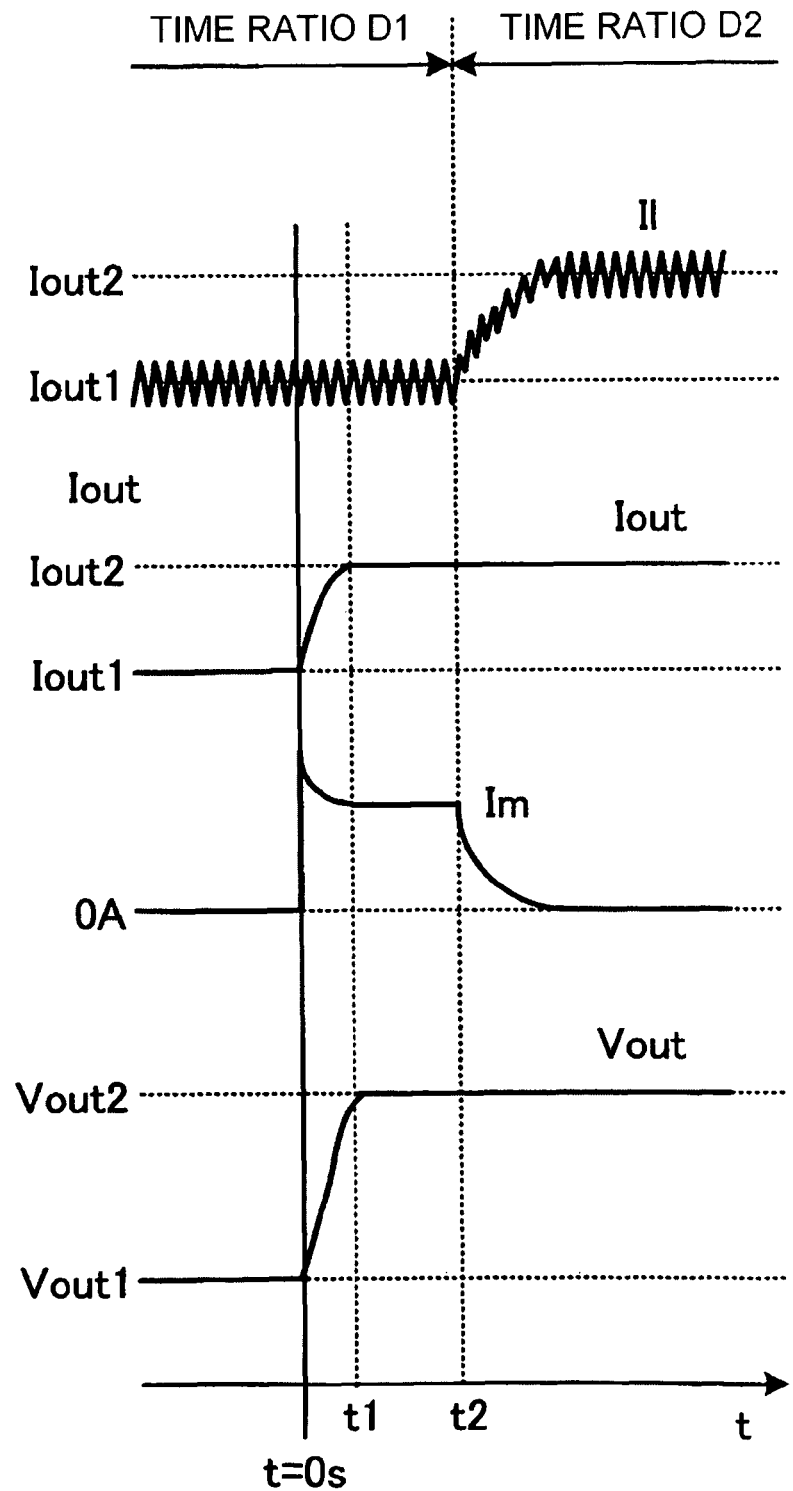
Figure 3C:
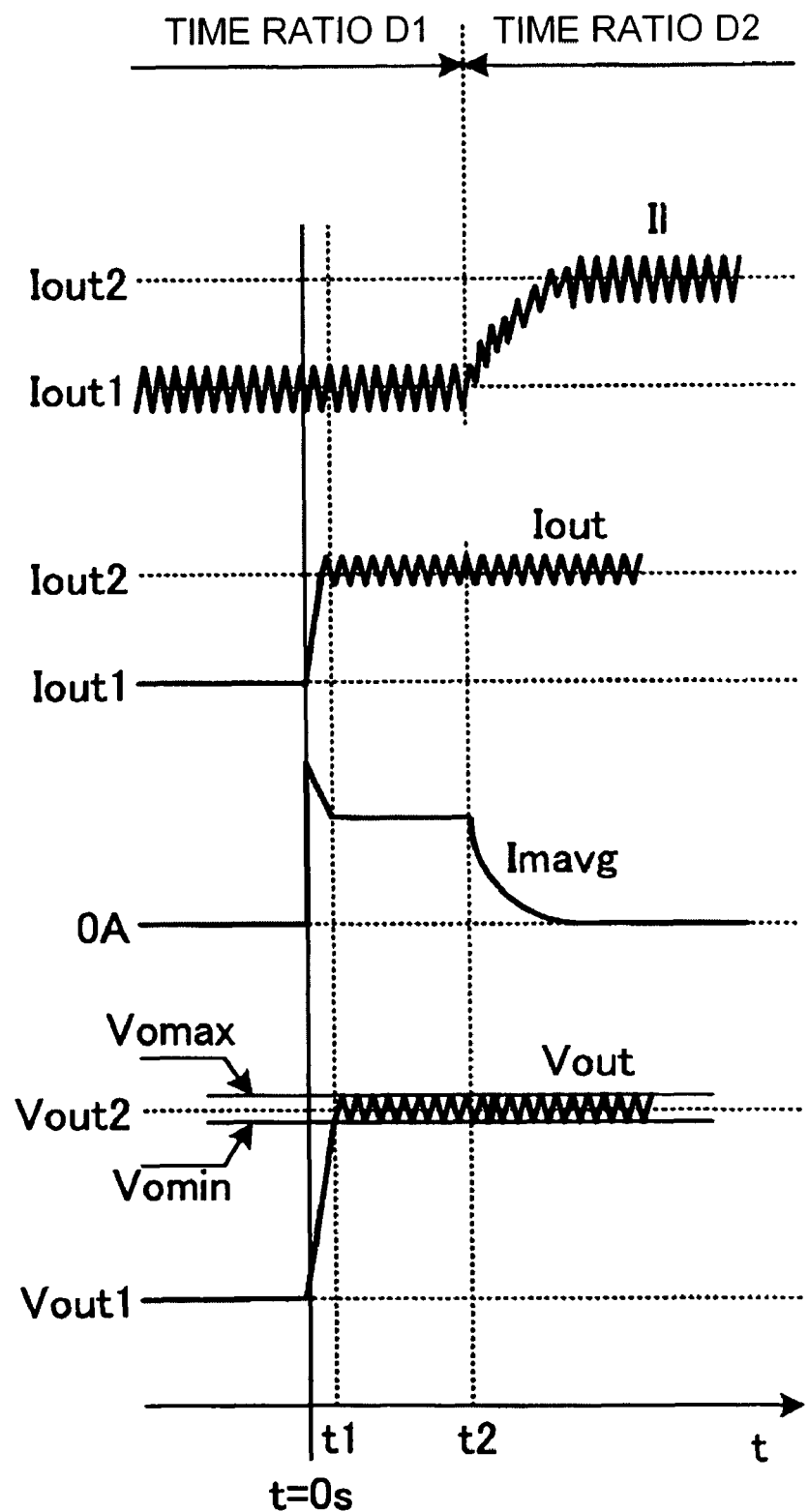
Figure 9A:
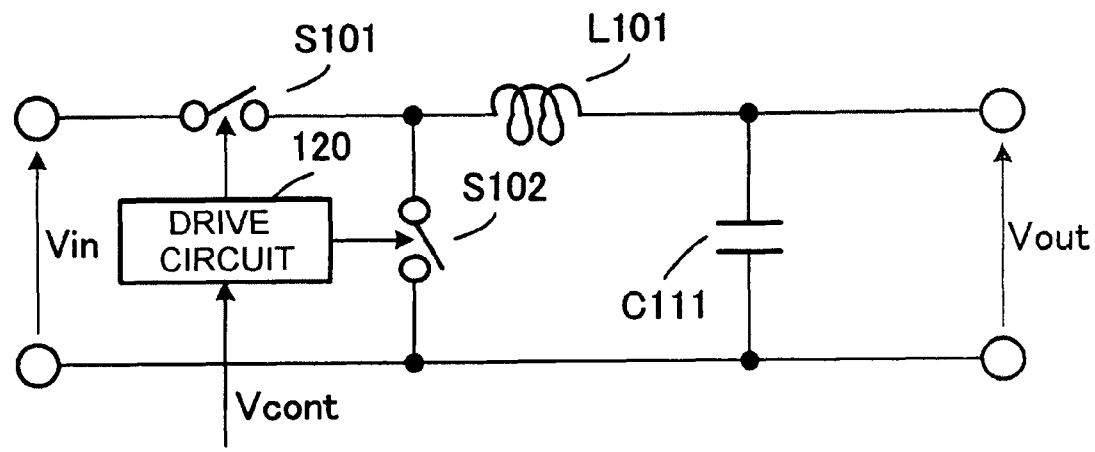
FIGS. 9A and 9B are circuit diagrams showing exemplary configurations of a converter section of the conventional DC-DC converter of FIG. 7.
Figure 9B:
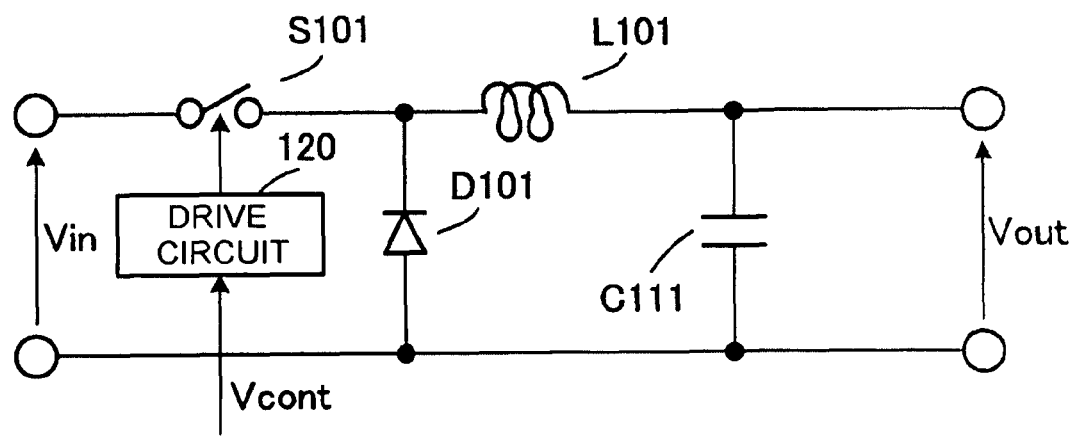
Figure 10A:
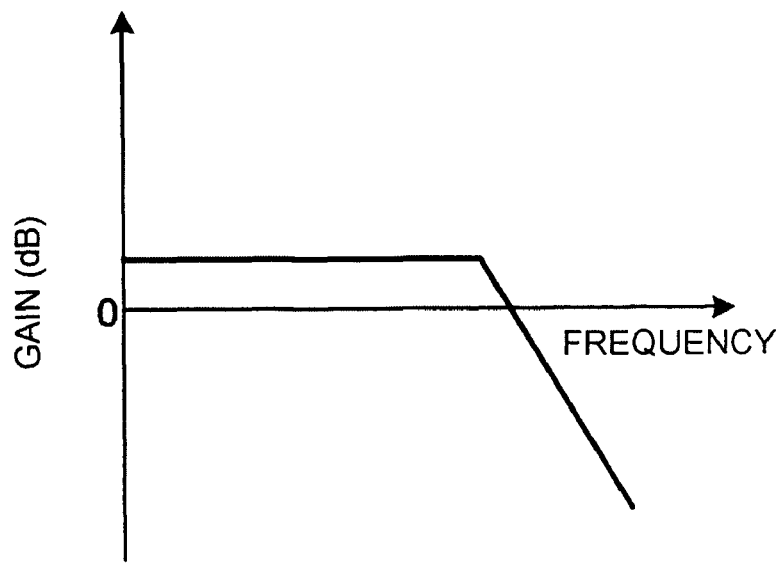
FIGS. 10A-10C are graphs showing frequency characteristics of the converter section and the control circuit of the conventional DC-DC converter of FIG. 7.
Figure 10A:
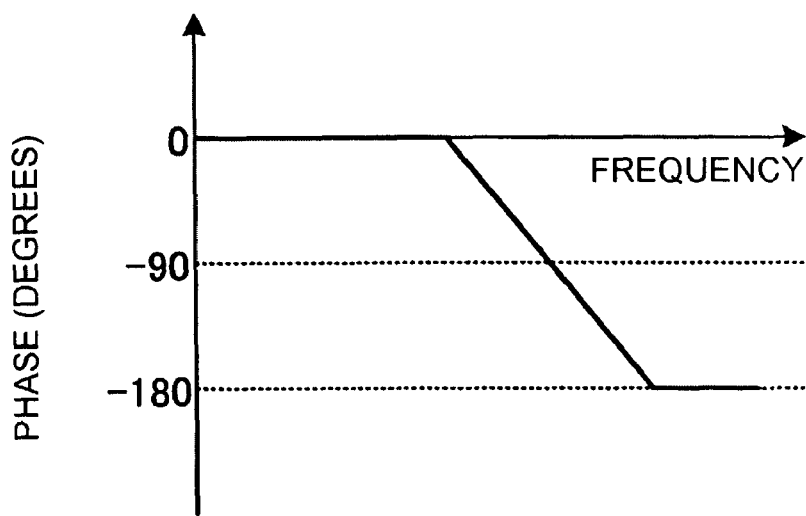
Figure 10B:
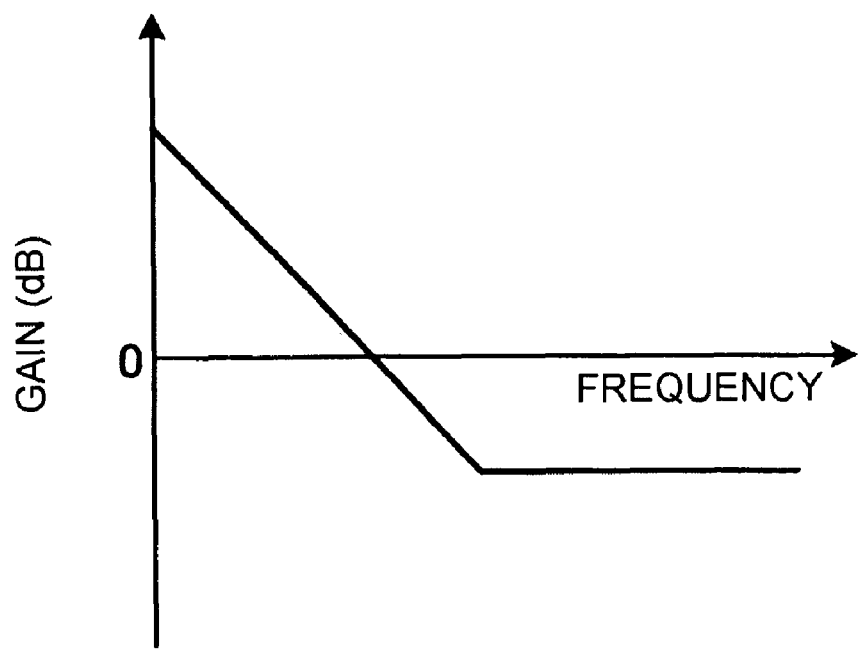
Figure 10B:
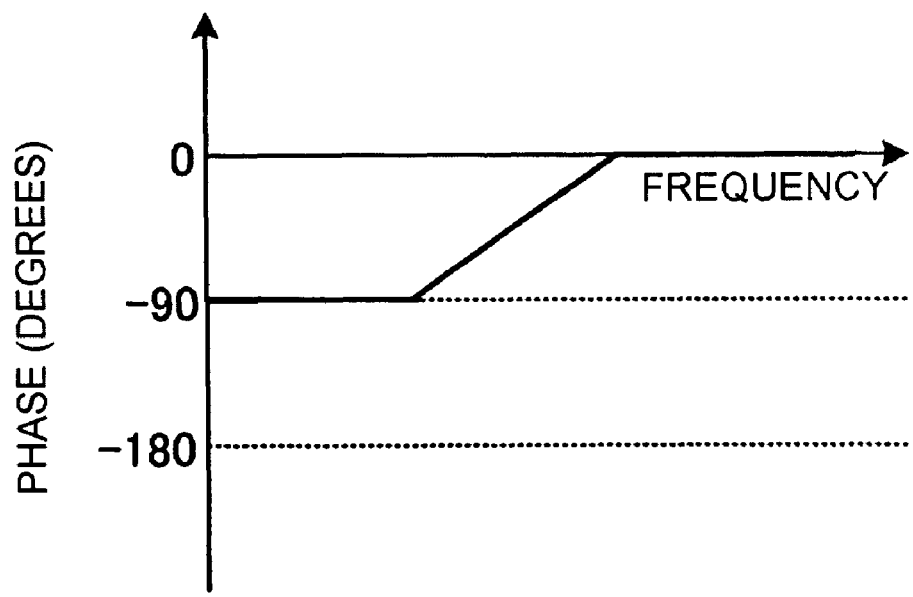
Figure 10C:
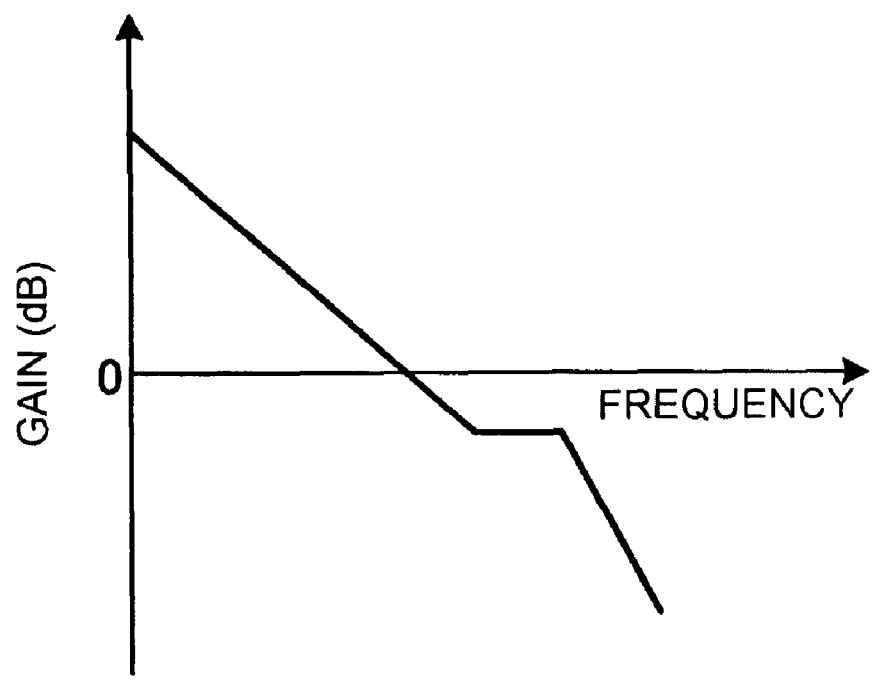
Figure 10C:
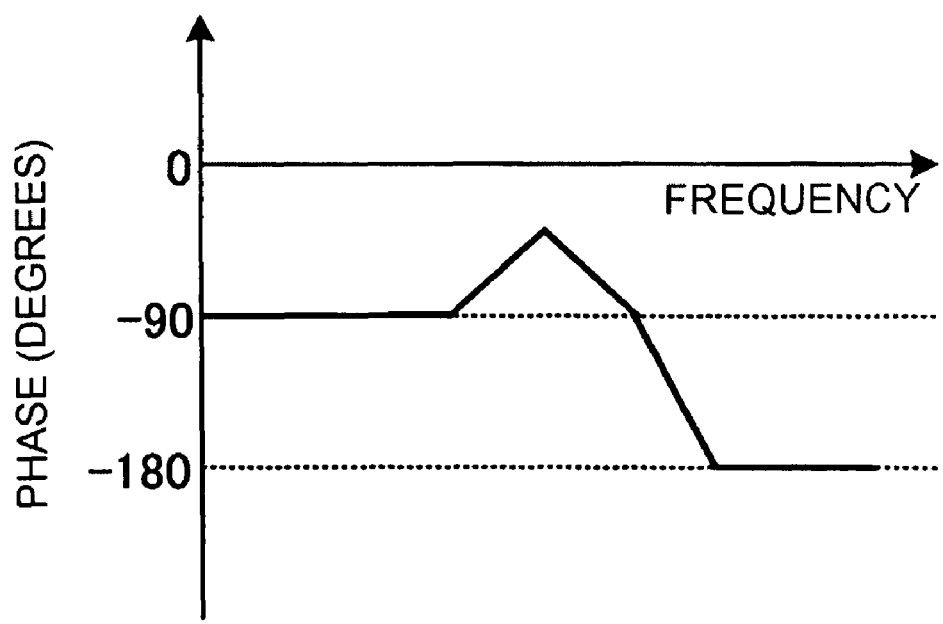

FIGS. 3A-3C conceptually show transient-response waveforms of a voltage and currents of DC-DC converters. FIG. 3A shows waveforms of the conventional DC-DC converters of FIGS. 9A and 9B. FIG. 3B shows waveforms of the DC-DC converter of FIG. 1 according to the first embodiment. FIG. 3C shows waveforms of the DC-DC converter of FIG. 2 according to the second embodiment. FIGS. 3A-3C show operations of a case that the target value of the output voltage Vout is changed stepwise from Vout1 to Vout2 at time t=0 s. In FIGS. 3A-3C, Vout1 and Iout1 are a steady-state output voltage Vout and output current Iout that are obtained when the on time ratio is equal to D1 and Vout2 and Iout2 are a steady-state output voltage Vout and output current Iout that are obtained when the on time ratio is equal to D2. Symbol I1 represents a current flowing through the choke coil L101 or L1. Although in FIGS. 3A-3C Vout1 is lower than Vout2, Vout1 and Vout2 may have the opposite magnitude relationship. Although in FIGS. 3A-3C Iout1 is smaller than Iout2, Iout1 and Iout2 may have the opposite magnitude relationship.

In the conventional DC-DC converter, as shown in FIG. 3A, when the on time ratio is changed stepwise from D1 to D2 at t=0 s, the target value of the output voltage Vout is changed from Vout1 to Vout2 and a transient operation (damping oscillation) occurs. Therefore, it takes considerable time to reach a stable state. The DC-DC converters according to the embodiments solve this problem.

In the DC-DC converter of FIG. 1 according to the first embodiment, the output voltage Vout and the output current Iout are monitored by the control circuit 10. In a steady state, the first and second MOS transistors M1 and M2 are kept off. Where Vout1<Vout2, as shown in FIG. 3B, a voltage is applied to the gate of the first MOS transistor M1 at t=0 s, whereby a current Im is caused to flow through the first MOS transistor M1 to increase the output voltage Vout. The output voltage Vout is adjusted by setting the gate voltage of the first MOS transistor M1 so that Vout becomes equal to Vout2. That is, the gate voltage of the first MOS transistor M1 is controlled by the control circuit 10 and the drive circuit 2, whereby the DC-DC converter functions as a series regulator having the input voltage Vin and the target output voltage Vout2. In this manner, the output voltage Vout can be changed at high speed.

In the example of FIG. 3B, after time t=t1 when Vout becomes equal to Vout2, the on time ratio of the main switch S1 is changed stepwise from D1 to D2 at time t=t2. As a result, the current I1 flowing through the choke coil L1 varies and the absolute value of the current Im flowing through the MOS transistor M1 varies. During that course, the gate voltage of the MOS transistor M1 may be adjusted so that Vout becomes equal to Vout2. The MOS transistor M1 is turned off when the absolute value of the current Im flowing through the MOS transistor M1 has become approximately equal to 0 A.

With the above operation, the output voltage Vout has already reached the target voltage Vout2 when the on time ratio of the DC-DC converter is changed rapidly. Therefore, no overshoot occurs and a stable operation is realized. The output voltage Vout can thus be changed at high speed.

Where Vout1>Vout2, the second MOS transistor M2 is controlled in place of the first MOS transistor M1. In either of the cases Vout1<Vout2 and Vout1>Vout2, both of the first MOS transistor M1 and the second MOS transistor M2 may be controlled during a transient response.

Also in the DC-DC converter of FIG. 2 according to the second embodiment, the output voltage Vout and the output current Iout are monitored by the control circuit 10. The first and second switches S11 and S12 are kept off in a steady state. Where Vout1<Vout2, as shown in FIG. 3C, the first switch S11 is turned on at t=0 s to increase the output voltage Vout. The first switch S11 is turned off when Vout becomes higher than or equal to Vomax. The second switch S12 may be turned on at the same time as the first switch S11 is turned off. As a result, the output voltage Vout lowers. When Vout becomes lower than or equal to Vomin, the first switch S11 is turned on. If the second switch S12 was turned on when the first switch S11 was turned off, at this time the second switch S12 is turned off at the same time as the first switch S11 is turned on.

With the above operation, in a period of t≧0 s, the output voltage Vout takes values between Vomax and Vomin. Symbol Imavg in FIG. 3C represents an average value of the current flowing from the switch S11 or S12 to the output side (ripples caused by the switching of the switches S11 and S12 are averaged). Symbols Vomax and Vomin represent an upper limit value and a lower limit value that are set by the control circuit 10 according to the target value of the output voltage Vout. For example, each of the limit values Vomax and Vomin is set equal to a given control signal or generated by amplifying it and dividing an amplified signal by resistors. The limit values Vomax and Vomin shown in FIG. 3C are target values that are set close to the changed target value Vout2 of the output voltage Vout.

In the example of FIG. 3C, after time t=t1 when Vout becomes higher than or equal to Vomin, the on time ratio of the main switch S1 is changed stepwise from D1 to D2 at time t=t2. As a result, the current I1 flowing through the choke coil L1 varies and the absolute value of the current Imavg flowing through the switch S11 or S12 decreases. The switches S11 and S12 are turned off when the absolute value of the current Imavg becomes approximately equal to 0 A.

With the above operation, the output voltage Vout has already become close to the target voltage Vout2 when the on time ratio of the DC-DC converter is changed rapidly. Therefore, no overshoot occurs and a stable operation is realized. The output voltage Vout can thus be changed at high speed.

Where Vout1>Vout2, the switch S12 is turned on at time t=0 s (see FIG. 3C). When the switch S12 is turned on, the output voltage Vout decreases. The switch S12 is turned off when Vout becomes lower than or equal to Vomin. The switch S11 may be turned on at the same time as the switch S12 is turned off. As a result, the output voltage Vout increases. The switch S12 is turned on when Vout becomes higher than or equal to Vomax.

With the above operation, in a period of t≧t1, the output voltage Vout takes values between Vomin and Vomax.

In the example of FIG. 3C, after time t=t1, the on time ratio of the main switch S1 is changed stepwise from D1 to D2 at time t=t2. As a result, the current I1 flowing through the choke coil L1 varies and the absolute value of the current Imavg flowing through the switch S11 or S12 decreases. The switches S11 and S12 are turned off when the absolute value of the current Imavg becomes approximately equal to 0 A.

With the above operation, the output voltage Vout has already become close to the target voltage Vout2 when the on time ratio of the DC-DC converter is changed rapidly. Therefore, no undershoot occurs and a stable operation is realized. The output voltage Vout can thus be changed at high speed.

Figure 4A:
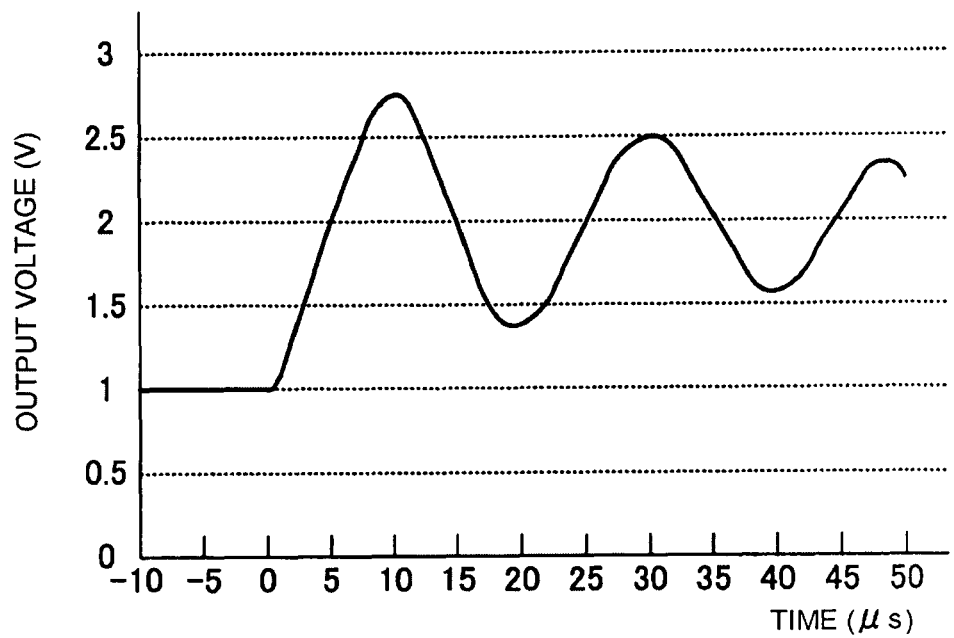
FIGS. 4A-4C show transient-response waveforms of an output voltage of DC-DC converters.
Figure 4B:
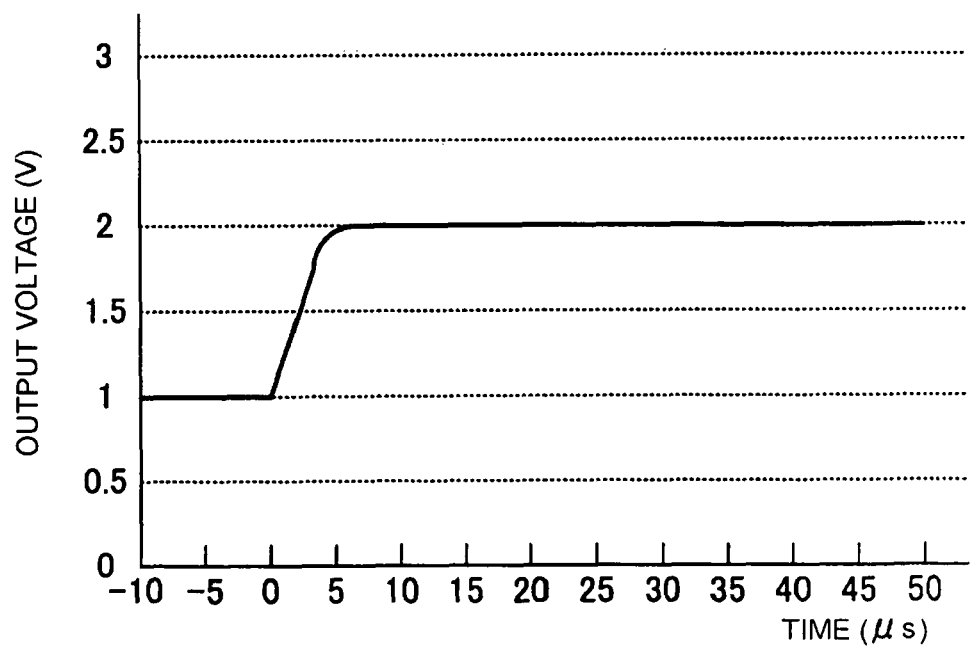
Figure 4C:
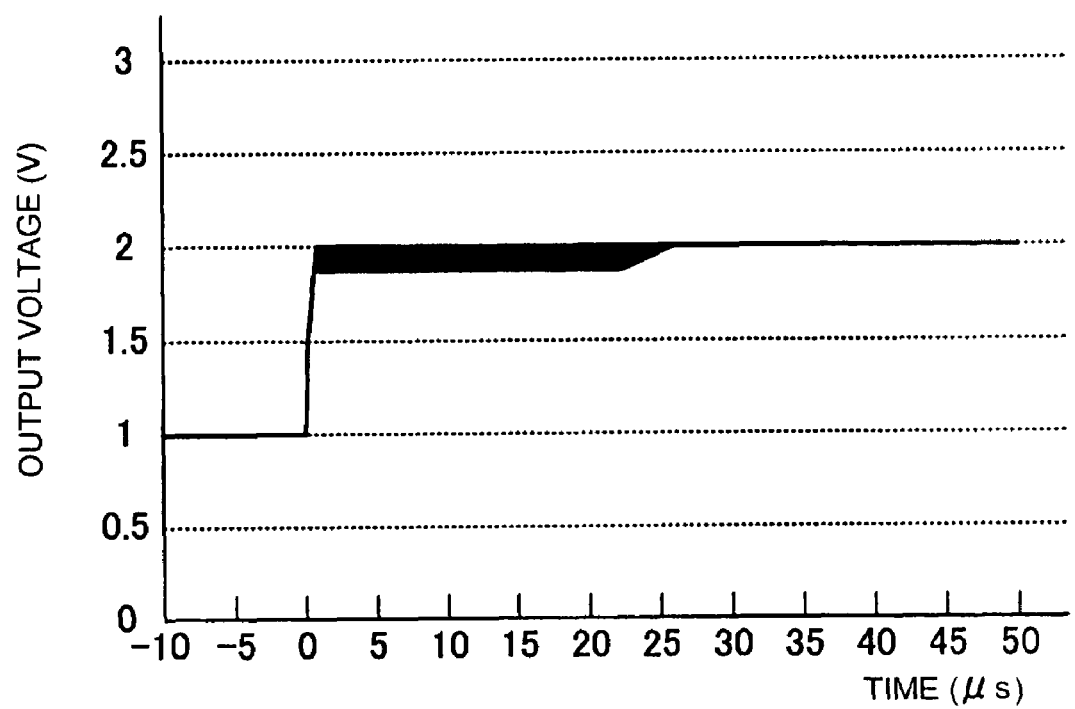

FIGS. 4A-4C show transient response waveforms of an output voltage of DC-DC converters. FIG. 4A shows a response waveform of the conventional DC-DC converters of FIGS. 9A and 9B. FIG. 4B shows a response waveform of the DC-DC converter of FIG. 1 according to the first embodiment. FIG. 4C shows a response waveform of the DC-DC converter of FIG. 2 according to the second embodiment. Each waveform is a step response waveform that is obtained when the input voltage Vin is 3.6 V and the output voltage Vout is changed from 1 V to 2 V. The inductance of the choke coil L101 or L1 is 2 µH, the capacitance of the output capacitor C111 or C1 is 4.7 µF, and the switching frequency of the main switch S101 or S1 is 5 MHz.

In the conventional DC-DC converter, as shown in FIG. 4A, an overshoot occurs in a transient response and the output voltage Vout does not settle even after a lapse of 50 µs. In contrast, in the DC-DC converter according to the first embodiment, no overshoot occurs and the output voltage Vout settles in about 5 µs. In the DC-DC converter according to the second embodiment, no overshoot occurs and the output voltage Vout rises in less than or equal to 1 µs. In this example, Vomax and Vomin are set at 2 V and 1.9 V, respectively.

As described above, in the DC-DC converters according to the first and second embodiments, the output voltage Vout can be settled at the target value at high speed, that is, the settling time of the output voltage in the transient response of the converter section can be reduced, by turning on/off the MOS transistors M1 and/or M2 or the switches S11 and/or S12. Therefore, a high-speed transient response is enabled without lowering the efficiency of the converter section and without the need for decreasing the parameters representing the characteristics of passive components of the converter section, in particular, the inductance of the choke coil L1 and the capacitance of the output capacitor C1. The response time can thus be shortened.

Figure 5A:
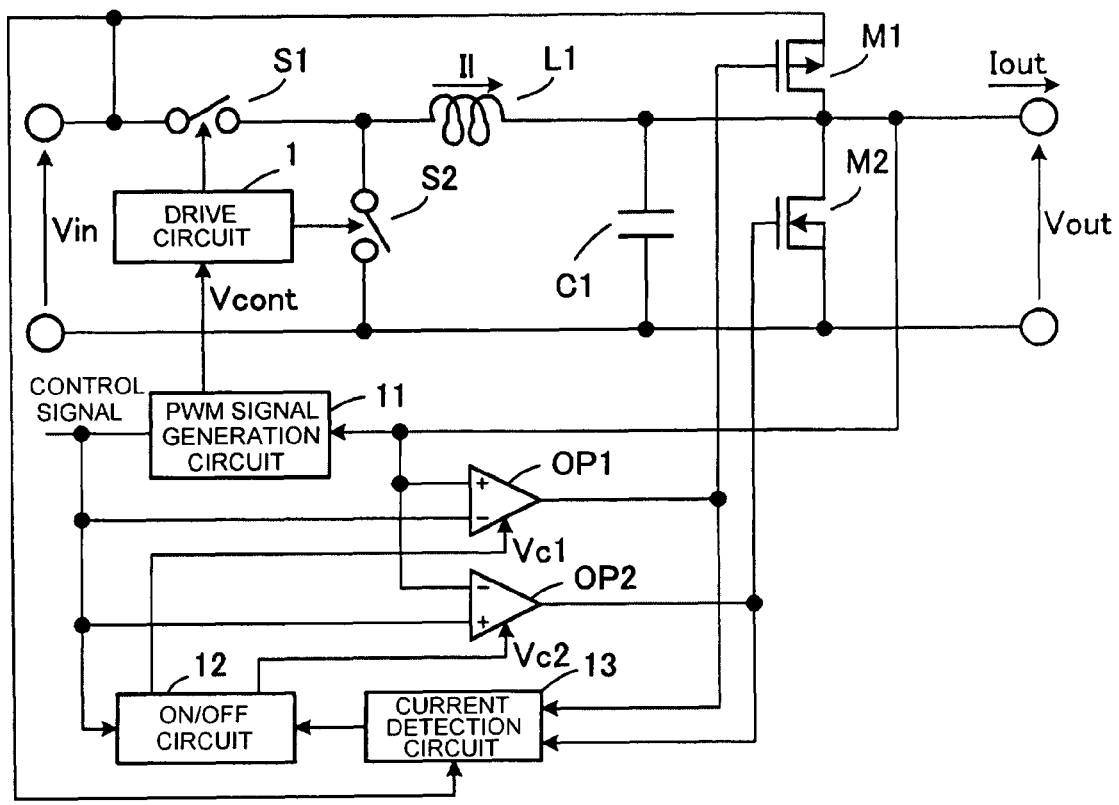
FIGS. 5A and 5B show specific examples of the circuit configuration of the DC-DC converter of FIG. 1.
Figure 5B:
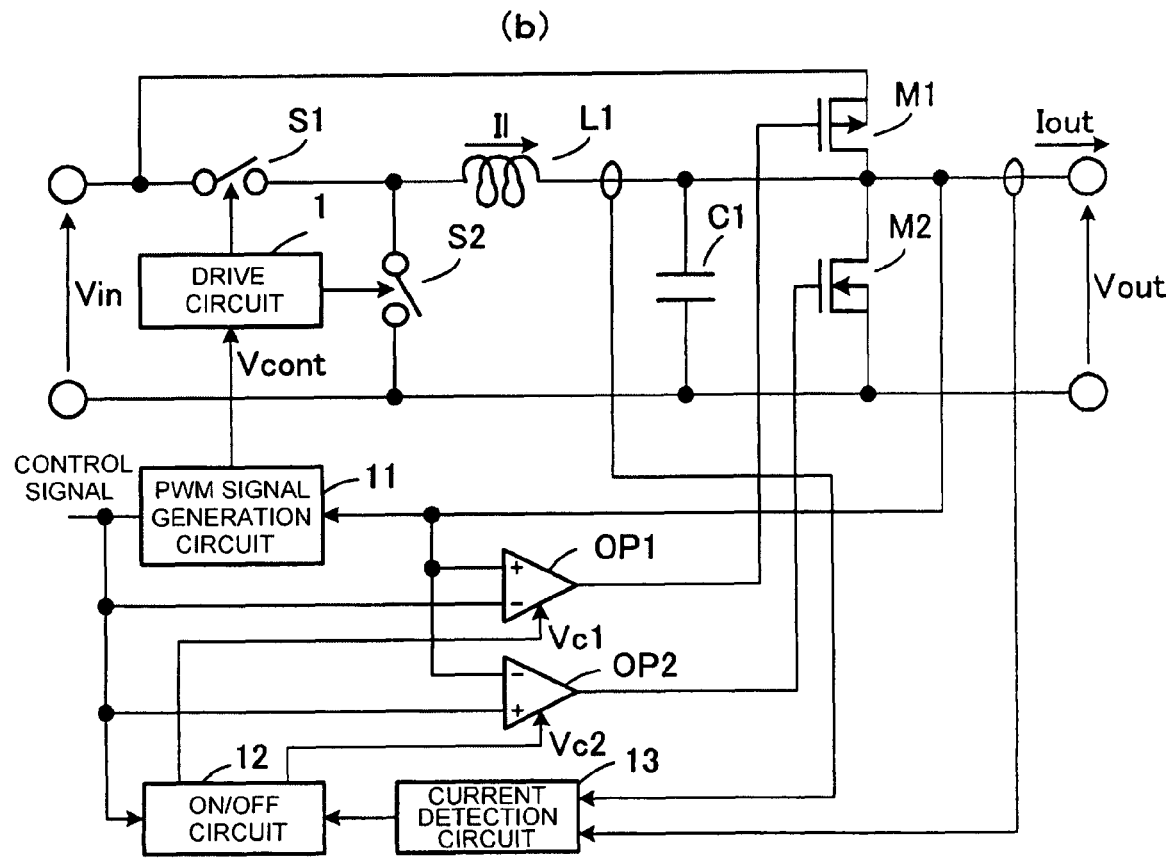

FIGS. 5A and 5B show specific examples of the circuit configuration of the DC-DC converter of FIG. 1 according to the first embodiment. The main switch S1 and the switch S2 are controlled, via the drive circuit 1, by a PWM signal generation circuit 11 to which a control signal is input. The first MOS transistor M1 and the second MOS transistor M2 are controlled by respective operational amplifiers OP1 and OP2. The operational amplifiers OP1 and OP2 are controlled by an on/off circuit 12 to which the control signal is input. A detection signal of a current detection circuit 13 is input to the on/off circuit 12.

In the circuit of FIG. 5A, in a steady state, the on/off circuit 12 outputs signals Vc1 and Vc2 for turning off the MOS transistors M1 and M2 to the operational amplifiers OP1 and OP2, respectively. Transient response operations will be described below in order.

(1) At the same time as the control signal varies, the on/off circuit 12 outputs a signal for rendering the MOS transistor M1 or M2 operational to the operational amplifier OP1 or OP2 and controls the gate voltage of the MOS transistor M1 or M2 so that the output voltage Vout becomes equal to a new target value (Vout2). At this time, the operational amplifier OP1 and the MOS transistor M1 or the operational amplifier OP2 and the MOS transistor M2 function as a series regulator.

(2) When the output voltage Vout becomes equal to Vout2, the PWM signal generation circuit 11 changes the time ratio to D2, whereupon the current I1 flowing through the choke coil L1 varies.

(3) When the current I1 flowing through the choke coil L1 varies, the current flowing through the MOS transistor M1 or M2 varies. When detecting that the current flowing through the MOS transistor M1 or M2 has become equal to 0 A, the current detection circuit 13 outputs that detection result to the on/off circuit 12.

(4) When the current flowing through the MOS transistor M1 or M2 becomes equal to 0 A, the on/off circuit 12 outputs signals Vc1 and Vc2 for turning off the MOS transistors M1 and M2 to the operational amplifiers OP1 and OP2, respectively.

The current detection circuit 13 shown in FIG. 5A estimates the current flowing through the MOS transistor M1 or M2 on the basis of its gate voltage and source voltage. For example, to detect the current flowing through the MOS transistor M1, a transistor which is smaller than the MOS transistor M1 (the W/L ratio is assumed to be 1/a of that of the MOS transistor M1) is used as a detection transistor and the gate and the source of the detection transistor are connected to the gate and the source of the MOS transistor M1. A current that is 1/a of the current flowing through the MOS transistor M1 flows through the detection transistor and can be used as a current detection result. The current flowing through the detection transistor can be converted into a voltage by causing the current to flow through a resistor (the voltage across the terminals of the resistor is used). Whether or not a current is flowing through the MOS transistor M1 can be judged and a current value (if a current is flowing) can be estimated on the basis of the detected current signal or voltage signal.

In the circuit of FIG. 5B, as in the case of the circuit of FIG. 5A, in a steady state, the on/off circuit 12 outputs signals Vc1 and Vc2 for turning off the MOS transistors M1 and M2 to the operational amplifiers OP1 and OP2, respectively. Transient response operations will be described below in order.

(1) At the same time as the control signal varies, the on/off circuit 12 outputs a signal for rendering the MOS transistor M1 or M2 operational to the operational amplifier OP1 or OP2 and controls the gate voltage of the MOS transistor M1 or M2 so that the output voltage Vout becomes equal to a new target value (Vout2). At this time, the operational amplifier OP1 and the MOS transistor M1 or the operational amplifier OP2 and the MOS transistor M2 function as a series regulator.

(2) When the output voltage Vout becomes equal to Vout2, the PWM signal generation circuit 11 changes the time ratio to D2, whereupon the current I1 flowing through the choke coil L1 varies.

(3) When the current I1 flowing through the choke coil L1 varies, the current flowing through the MOS transistor M1 or M2 varies. When detecting that the average value of the current I1 flowing through the choke coil L1 has become equal to the output current Iout by comparing the current I1 flowing through the choke coil L1 with the output current Iout, the current detection circuit 13 outputs that detection result to the on/off circuit 12.

(4) When the average value of the current I1 flowing through the choke coil L1 becomes equal to the output current Iout, the on/off circuit 12 outputs signals Vc1 and Vc2 for turning off the MOS transistors M1 and M2 to the operational amplifiers OP1 and OP2, respectively.

The current detection circuit 13 shown in FIG. 5B detects the current I1 flowing through the choke coil L1 and the output current Iout by means of a current detection resistor, a current transformer, or the like. The current I1 flowing through the choke coil L1 can be estimated by using a MOS transistor as the main switch S1 and detecting its gate voltage and source voltage in the same manner as the current detection circuit 13 shown in FIG. 5A detects the current flowing through the MOS transistor M1 or M2.

Figure 6A:
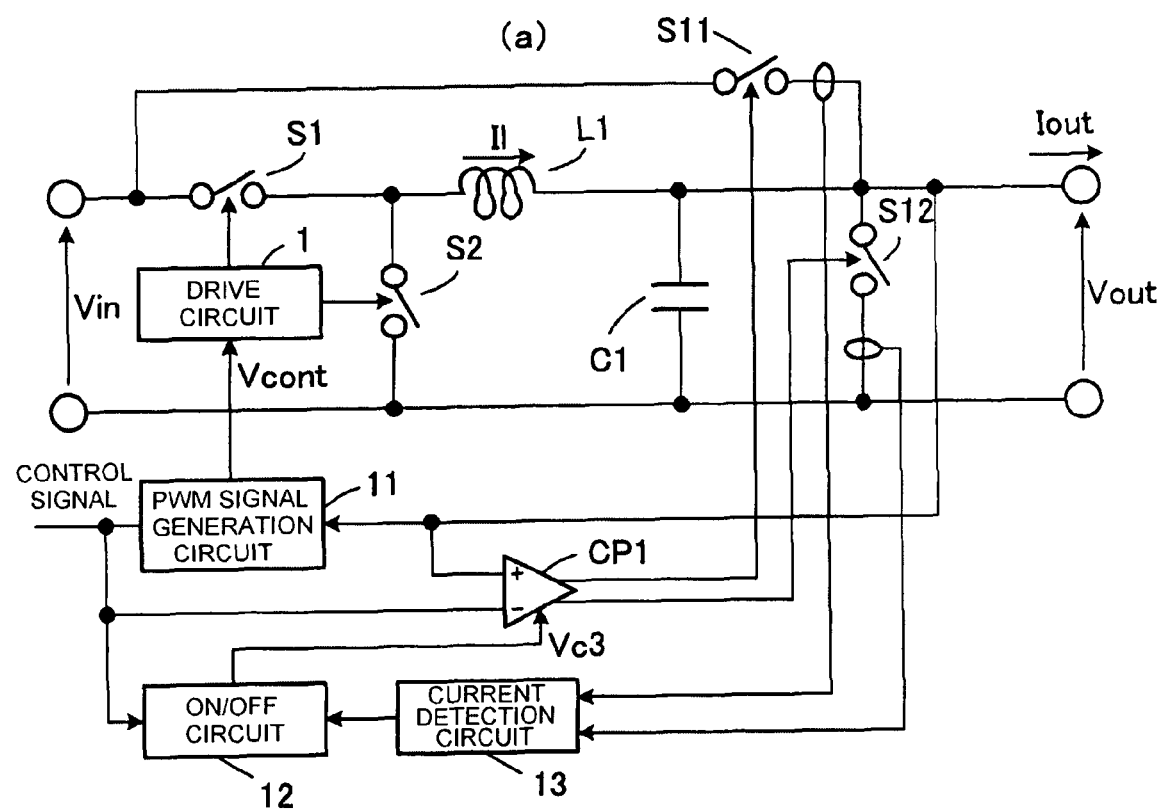
FIGS. 6A and 6B show specific examples of the circuit configuration of the DC-DC converter of FIG. 2.
Figure 6B:
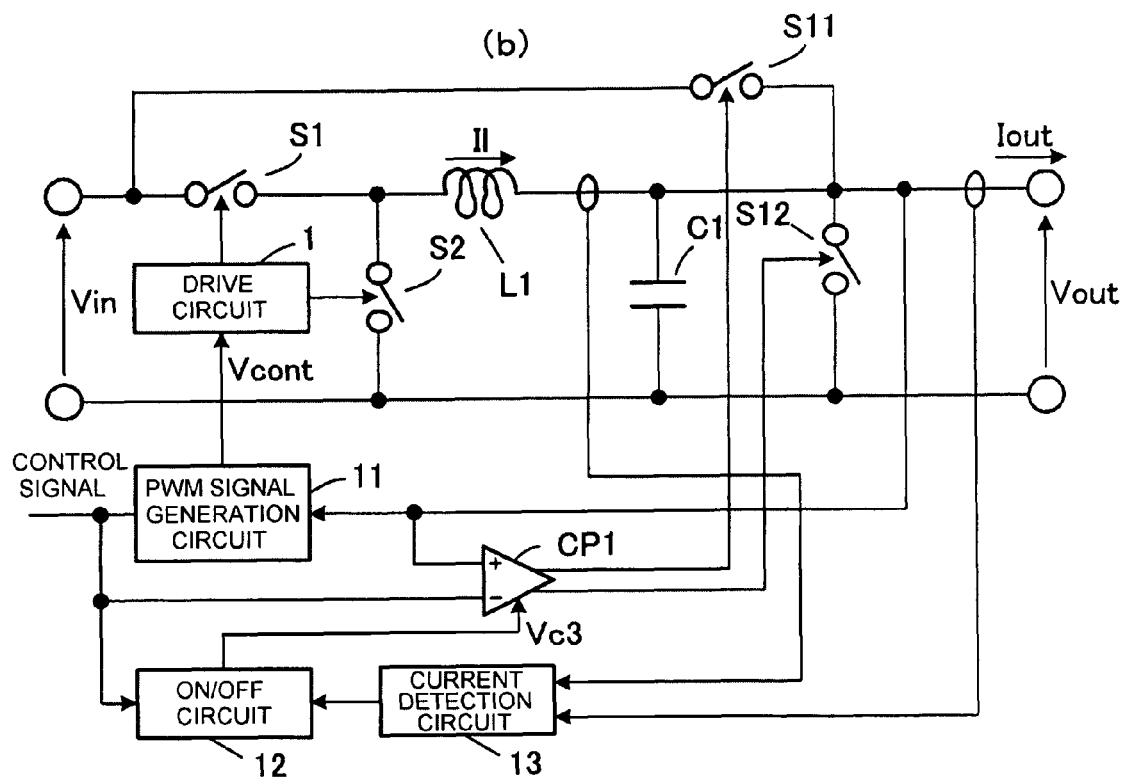
Figure 7:
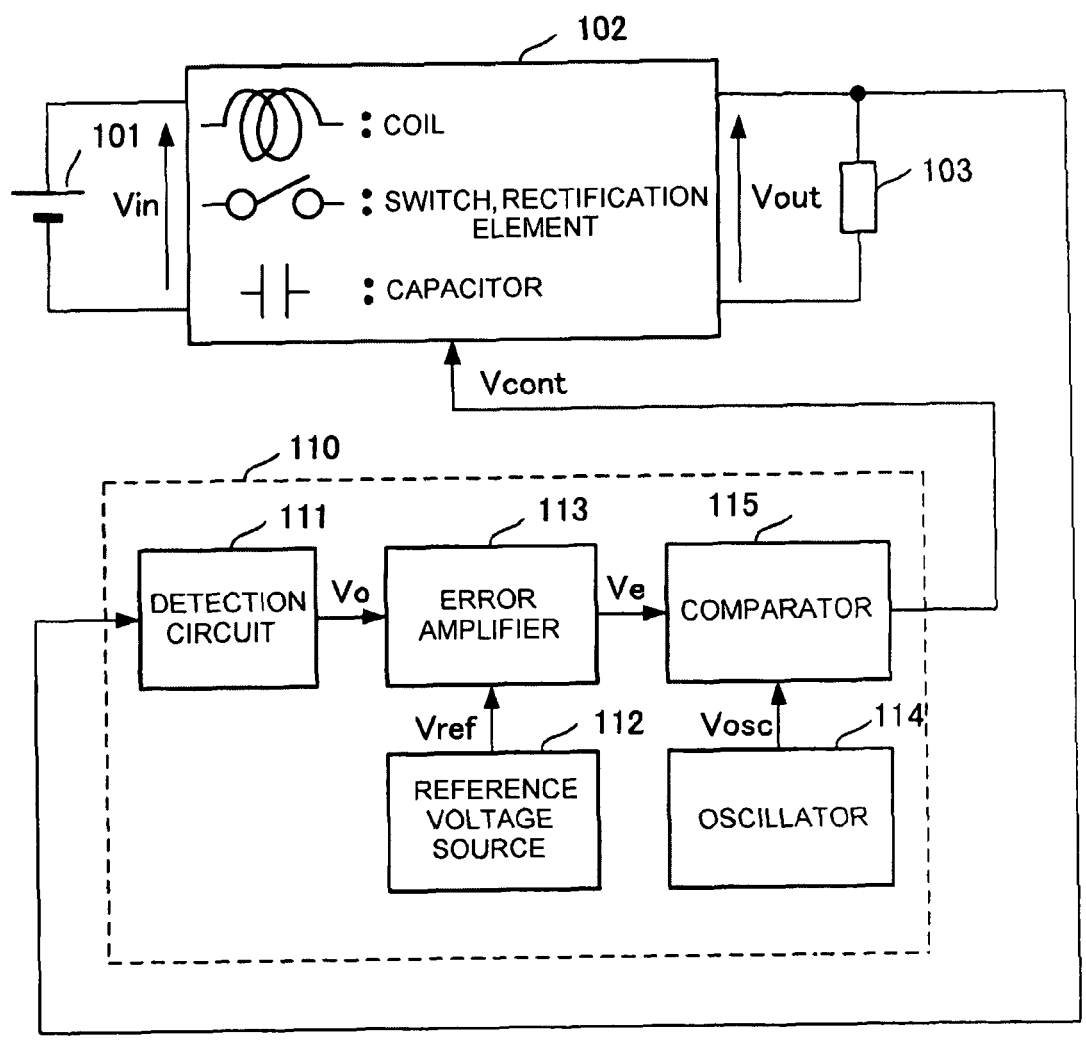
FIG. 7 is a block diagram showing the configuration of a general, conventional DC-DC converter.
Figure 8:
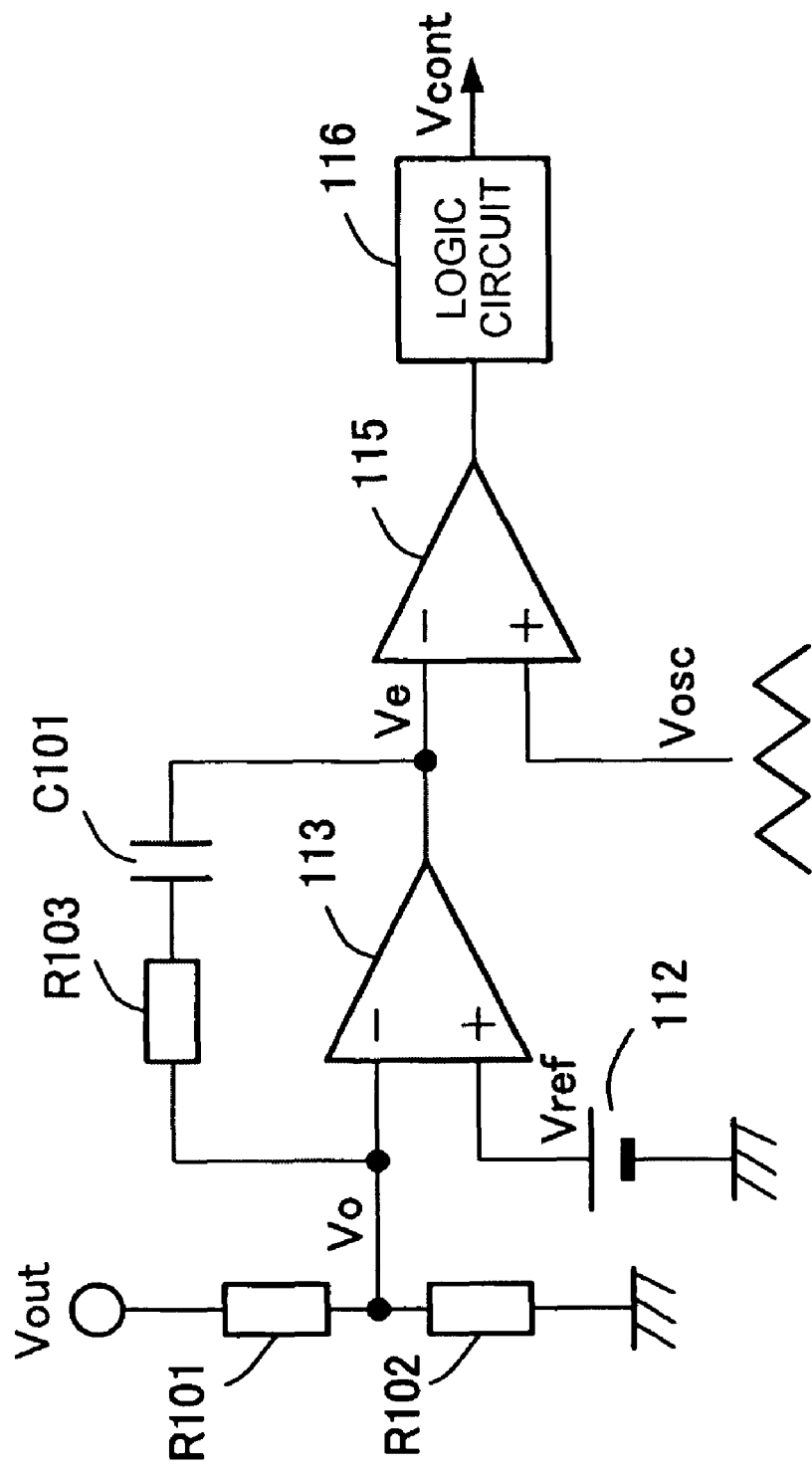
FIG. 8 shows the configuration of a control circuit of the conventional DC-DC converter of FIG. 7.

FIGS. 6A and 6B show specific examples of the circuit configuration of the DC-DC converter of FIG. 2 according to the second embodiment. The switches S11 and S12 are controlled by a comparator CP1 which exhibits a hysteresis characteristic. The other part of the configuration of the control system of FIG. 6A or 6B is the same as the corresponding part of the configuration of the control system shown in FIG. 5A or 5B.

In the circuit of FIG. 6A, in a steady state, the on/off circuit 12 outputs a signal Vc3 for turning off the switches S11 and S12 to the comparator CP1. Transient response operations will be described below in order.

(1) At the same time as the control signal varies, the on/off circuit 12 outputs a signal (s) for rendering the switch S11 and/or the switch S12 operational to the comparator CP1 and controls the switches S11 and S12 so that they are turned on/off repeatedly so that the output voltage Vout take values between Vomax and Vomin that are suitable for Vout2.

(2) When the output voltage Vout comes to take values (≈Vout2) between Vomax and Vomin, the PWM signal generation circuit 11 changes the time ratio to D2, whereupon the current I1 flowing through the choke coil L1 varies.

(3) When the current I1 flowing through the choke coil L1 varies, the current flowing through the switch S11 or S12 varies. When detecting that the average current flowing through the switch S11 or S12 has become equal to 0 A, the current detection circuit 13 outputs that detection result to the on/off circuit 12. The current flowing through the switch S11 or S12 can be detected or estimated by the same method as the current flowing through the choke coil L1 is detected in the circuit of FIG. 5B.

(4) When the average current flowing through the switch S11 or S12 becomes equal to 0 A, the on/off circuit 12 outputs a signal Vc3 for turning off the switches S11 and S12 to the comparator CP1.

In the circuit of FIG. 6B, as in the case of the circuit of FIG. 6A, in a steady state, the on/off circuit 12 outputs a signal Vc3 for turning off the switches S11 and S12 to the comparator CP1. Transient response operations will be described below in order.

(1) At the same time as the control signal varies, the on/off circuit 12 outputs a signal (s) for rendering the switch S11 and/or the switch S12 operational to the comparator CP1 and controls the switches S11 and S12 so that they are turned on/off repeatedly so that the output voltage Vout take values between Vomax and Vomin that are suitable for Vout2.

(2) When the output voltage Vout comes to take values (≅Vout2) between Vomax and Vomin, the PWM signal generation circuit 11 changes the time ratio to D2, whereupon the current I1 flowing through the choke coil L1 varies.

(3) When the current I1 flowing through the choke coil L1 varies, the current flowing through the switch S11 or S12 varies. When detecting that the average value of the current I1 flowing through the choke coil L1 has become equal to the output current Iout by comparing the current I1 flowing through the choke coil L1 with the output current Iout, the current detection circuit 13 outputs that detection result to the on/off circuit 12.

(4) When the average value of the current I1 flowing through the choke coil L1 becomes equal to the output current Iout, the on/off circuit 12 outputs a signal Vc3 for turning off the switches S11 and S12 to the comparator CP1.

As described above, in the circuits of FIGS. 5A and 5B and FIGS. 6A and 6B, whether a transient operation has completed is judged by detecting a current value. Alternatively, it may be judged that a transient operation has completed when a prescribed time has elapsed from a time point when a control signal varied or the output voltage Vout became equal to Vout2. In this case, the prescribed time can be set by using a timer, a counter, a delay circuit, or the like.

In the above circuits, PWM pulses having a time ratio D=D2 start to be output when Vout becomes equal to Vout2 (after a control signal varied). Alternatively, they may start to be output when a prescribed time has elapsed from a time point when a control signal varied. Also in this case, the prescribed time can be set by using a timer, a counter, a delay circuit, or the like.

As a further alternative, PWM pulses having a time ratio D=D2 may start to be output at the same time as a control signal varies. In this case, there may occur a case that the time ratio D varies gradually from D1 to D2 depending on the control loop response.

The main switch S1 and the switch S2 may be kept off until the output voltage Vout becomes equal to Vout2 or for a prescribed time from a time point when a control signal varied.

In the above circuits, the output voltage Vout is input directly to the PWM signal generation circuit 11 and the operational amplifiers OP1 and OP2 or the comparator CP1. Alternatively, a divided voltage of the output voltage Vout may be input to them.

While the present invention has been particularly shown and described with reference to preferred embodiments thereof, it will be understood by those skilled in the art that the foregoing and other changes in form and details can be made therein without departing from the spirit and scope of the invention.

What is claimed is:

1. A DC-DC converter, comprising:
a converter section, including a series circuit having a main switch and an inductance element connected in series, and an output capacitor connected to one end of the series circuit, which outputs an output voltage from said one end;
a first transistor connected in parallel to the series circuit; and
a second transistor connected in parallel to the output capacitor.

2. The DC-DC converter according to claim 1, wherein at least one of the first and second transistors is configured to be driven in response to a change in the output voltage so as to reduce a settling time in a transient response of the converter section.

3. The DC-DC converter according to claim 2, wherein the first and second transistors are configured to be turned off after the output voltage has settled in the transient response of the converter section.

4. The DC-DC converter according to claim 2, wherein said at least one of the first and second transistors is configured to be driven in response to the change in the output voltage, after the output voltage reaches a target value.

5. The DC-DC converter according to claim 4, wherein the first and second transistors are configured to be turned off after the output voltage has settled in the transient response of the converter section.

6. The DC-DC converter according to claim 2, wherein said at least one of the first and second transistors is configured to be driven in response to the change in the output voltage, after the output voltage reaches a value between a maximum value and a minimum value.

7. A DC-DC converter, comprising:
a converter section including a series circuit having a main switch and an inductance element connected in series, and an output capacitor connected to one end of the series circuit, which outputs an output voltage from said one end;
a first switch connected in parallel to the series circuit; and
a second switch connected in parallel to the output capacitor.

8. The DC-DC converter according to claim 7, wherein at least one of the first and second switches is configured to be driven in response to a change in the output voltage to reduce a settling time in a transient response of the converter section.

9. The DC-DC converter according to claim 8, wherein the first and second switches are configured to be turned off after the output voltage has settled in the transient response of the converter section.

10. The DC-DC converter according to claim 8, wherein said at least one of the first and second switches is configured to be driven in response to the change in the output voltage, after the output voltage reaches a target value.

11. The DC-DC converter according to claim 8, wherein said at least one of the first and second switches is configured to be driven in response to a change in the output voltage, after the output voltage reaches a value between a maximum value and a minimum value.

12. The DC-DC converter according to claim 11, wherein the first and the second switch are configured so that if the output voltage becomes higher than or equal to the maximum value by driving said at least one of the first and second switches, the second switch is turned on.

13. The DC-DC converter according to claim 11, wherein the first and the second switch are configured so that if the output voltage becomes lower than or equal to the minimum value by driving said at least one of the first and second switches, the first switch is turned on.

14. The DC-DC converter according to claim 10, wherein the first and second switches are turned off after the output voltage has settled in the transient response of the converter section.

15. The DC-DC converter according to claim 14, wherein said at least one of the first and second switches is configured to be driven in response to a change in the output voltage, after the output voltage reaches a value between a maximum value and a minimum value.

16. The DC-DC converter according to claim 15, wherein the first and the second switch are configured so that if the output voltage becomes higher than or equal to the maximum value by driving said at least one of the first and second switches, the second switch is turned on.

17. The DC-DC converter according to claim 15, wherein the first and the second switch are configured so that if the output voltage becomes lower than or equal to the minimum value by driving said at least one of the first and second switches, the first switch is turned on.

* * * * *